(12) United States Patent
Arche et al.

(10) Patent No.: US 7,753,787 B2
(45) Date of Patent: Jul. 13, 2010

(54) CONVERTIBLE LAP REST AND TABLE MOUNT FOR RACING WHEEL

(75) Inventors: Glenn Steven Arche, Bothell, WA (US); Daniel James Blase, Redmond, WA (US); Joshua David Maruska, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 11/674,419

(22) Filed: Feb. 13, 2007

(65) Prior Publication Data

US 2008/0191415 A1  Aug. 14, 2008

(51) Int. Cl.
*A63F 13/08* (2006.01)

(52) U.S. Cl. .............................. 463/37; 463/36; 463/47

(58) Field of Classification Search .................. 463/46, 463/47, 36, 37; 273/148
See application file for complete search history.

(56) References Cited

U.S. PATENT DOCUMENTS

| 2,041,017 | A | * | 5/1936 | Pennington | 248/455 |
| 4,422,640 | A | | 12/1983 | Tamarkin | 273/148 |
| 4,504,059 | A | * | 3/1985 | Weinrieb | 273/148 B |
| 5,727,188 | A | * | 3/1998 | Hayes | 703/8 |
| 5,829,745 | A | * | 11/1998 | Houle | 273/148 B |
| 6,119,991 | A | * | 9/2000 | Thorne et al. | 248/229.2 |
| 6,251,015 | B1 | * | 6/2001 | Caprai | 463/36 |
| 6,290,228 | B1 | | 9/2001 | Roberts et al. | 273/148 |
| 6,378,826 | B1 | | 4/2002 | Knaub et al. | 248/229.21 |
| 6,544,124 | B2 | | 4/2003 | Ireland et al. | 463/37 |
| 6,663,058 | B1 | * | 12/2003 | Peterson et al. | 248/125.9 |
| 6,976,677 | B1 | | 12/2005 | McVicar | 273/148 |
| D573,198 | S | * | 7/2008 | Bramfitt | D21/333 |
| 2002/0142838 | A1 | | 10/2002 | Russell | 463/37 |
| 2003/0067111 | A1 | | 4/2003 | Swan et al. | 273/148 |
| 2003/0171190 | A1 | | 9/2003 | Rice | 482/57 |
| 2005/0132939 | A1 | * | 6/2005 | McClellion | 108/92 |
| 2006/0111181 | A1 | | 5/2006 | Thorsen | 463/36 |

FOREIGN PATENT DOCUMENTS

GB    2 392 718 A1    3/2004

OTHER PUBLICATIONS

Logitech™ DriveFX™ Racing Wheel for Xbox 360, http://activewin.com/reviews/hardware/steeringwheels/logitech/drivefx/index.shtml, Downloaded from the Internet Nov. 10, 2006, 6 pages.
GameCube Dual Shock Mini Wheel (8"), Xyramax, http://www.xyramax.co.uk.catalog/product_info.php/products_id/117, © 2005, 2 pages.

* cited by examiner

*Primary Examiner*—James S McClellan
(74) *Attorney, Agent, or Firm*—Woodcock Washburn LLP

(57) ABSTRACT

A convertible game controller that can be configured for use on a person's lap or on a table top is disclosed. The convertible game controller includes a lap rest designed to support a game controller on a person's lap. The lap rest is also designed to be attached to a table clamp so that the game controller can be secured to a table top. A latch and hooks are provided on the table clamp and lap rest that allow the lap rest to be attached to the table clamp.

20 Claims, 4 Drawing Sheets

CONVERTIBLE LAP REST AND TABLE MOUNT FOR RACING WHEEL

BACKGROUND

The use of game controllers, and more particularly steering wheels, with personal computers or gaming systems is well known. Game controllers, such as steering wheels, often need a stable support in order for a user to properly manipulate the game controller. Some game controllers can be attached to a stable surface like a desk or a table. Sometimes, however, a stable surface is not available for the game controller, or a user may prefer to not use a table for support. The need to mount the game controller to a stable surface limits the versatility and mobility of the game controller. Thus, it is desirable to provide a game controller that can be properly supported on either a user's lap or a table top.

SUMMARY

Described herein is a game controller, such as a racing wheel controller, that can be converted for use on a user's lap or a table top. The game controller includes a lap rest configured to support the game controller on either a user's lap or a table top. The undersurface of the lap rest includes ribs, preferably made of any suitable material, that prevents the lap rest from slipping on a user's lap. Also, support pads are provided on the lateral edges of the lap rest to prevent the lap rest from slipping on a table top. The game controller also includes a table clamp that can be attached to the lap rest and secured to a table top. In one embodiment, the table clamp is attached to the lap rest with a hook on the table clamp that is inserted into a hook hole in the lap rest, and also, with a latch on the table clamp that engages a latch socket in the undersurface of the lap rest. Alternatively, the hook may be on the lap rest and the hook hole may be in the table clamp. Also, the latch may be on the lap rest and the latch socket in the table clamp.

This Summary is provided to introduce a selection of concepts in a simplified form that are further described below in the Detailed Description of Illustrative Embodiments. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Figure 1:
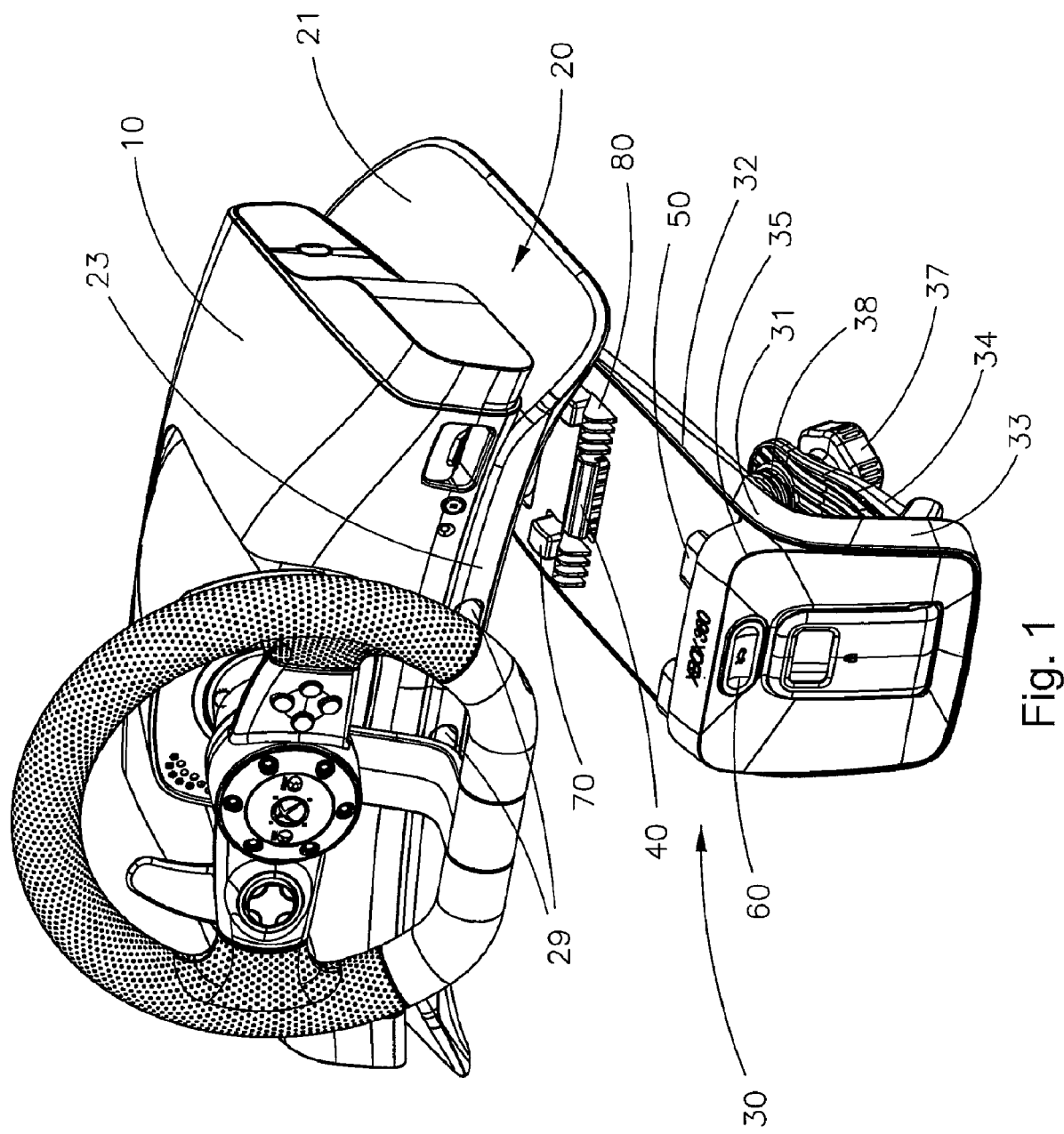
FIG. 1 shows an isometric view of an exemplary game controller having a lap rest and a table clamp.

FIG. 1 depicts a convertible game controller 10, such as a racing wheel controller, that can be configured for use on a table top or a user's lap. As shown in FIG. 1, the game controller includes a lap rest 20 and a table clamp 30. The lap rest 20 is configured to rest on a user's lap or on a table top. The lap rest 20 can be attached to the table clamp 30, which can be secured to a table top along with the lap rest 20.

Directional references (e.g. top, bottom, front, back) made with respect to parts of the game controller 10 assume that the game controller is supported upright on a table or a user's lap in a position that the game controller is intended to be used. Front and back refer to positions relative to a user; front being closer to a user and back being farther from a user. Right and left refer to a user's right and left sides. Lateral refers to the sides corresponding to a user's right and left sides.

Figure 2:
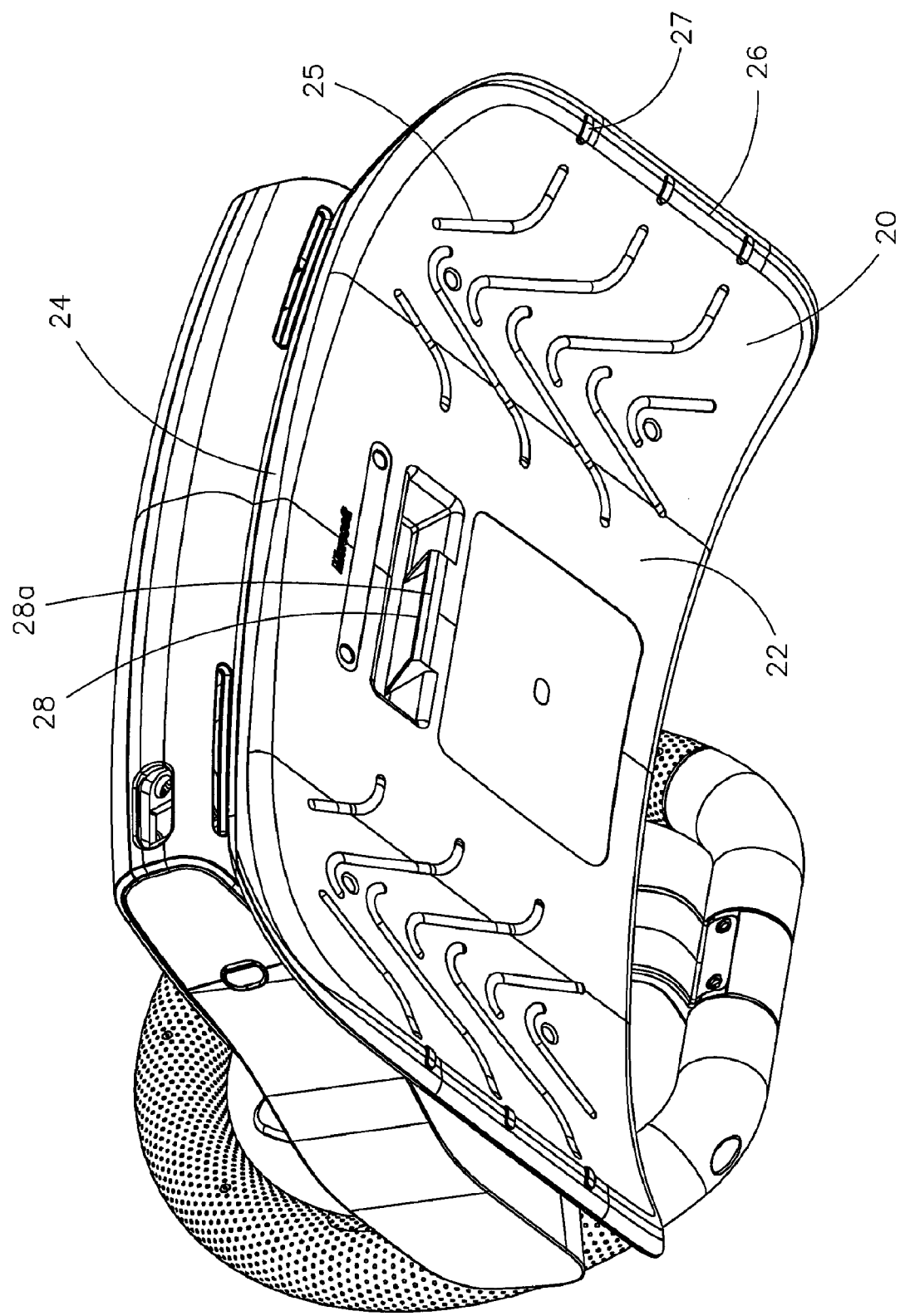
FIG. 2 shows a bottom view of the exemplary lap rest of FIG. 1.

The lap rest 20 of the game controller 10 preferably has a substantially rectangular body that is configured to rest on a user's lap or a table top. Referring to FIGS. 1 and 2, the body of the lap rest 20 has a top surface 21, undersurface 22, front surface 23, and back surface 24. Also, the undersurface 22 of the lap rest 20 is preferably curved downward, particularly at the lateral edges. The curved shape of the undersurface 22 of the lap rest 20 limits the lateral movement of the lap rest 20 when placed on a user's lap. Additionally, in order to limit slippage of the lap rest 20 on a user's lap, the undersurface 22 of the lap rest 20 preferably has ribs 25 disposed thereon. The ribs 25 are preferably made of a material that provides friction against a user's lap. The ribs may be made of any suitable material that allows the shape of the ribs to limit slippage of the lap rest on a user's lap. In a preferred embodiment, the ribs are made of a material that is more pliable than the material of the undersurface 22 of the lap rest 20, such as rubber, nylon, soft plastic, and the like.

Although the undersurface 22 of the lap rest 20 is generally curved, the lateral edges of the undersurface 22 preferably have flat surfaces 26 that define a horizontal plane. The flat surfaces 26 make the curved undersurface 22 of the lap rest 20 more stable when it is placed on a flat table top. Further, the flat surfaces 26 have support pads 27 that prevent the lap rest 20 from slipping when placed on a table top. The support pads 27 are preferably made of a material that provides friction against a table top, such as rubber, nylon, a soft plastic and the like.

Referring to FIGS. 1 and 2, the lap rest 20 preferably has a substantially rectangular body whose width from left to right is greater than its depth from front to back. The substantially rectangular shape of the lap rest 20 provides a laterally stable support for the game controller 10 both when the lap rest is placed on a user's lap and when the lap rest is secured onto a table top. Further, when a lap rest 20 is attached to a table clamp 30 that is secured to a table top, the flat surfaces 26 having the support pads 27 contact the table top and act like outriggers that prevent the lap rest 20 from rocking laterally. Also, the lap rest 20 is preferably dimensioned such that when it is attached to the table clamp 30 and the flat surfaces 26 contact a table top, the lap rest 20 is slightly bent like a leaf spring and compressed against the table top to firmly secure the game controller 10.

Referring to FIGS. 1 and 2, the lap rest 20 has a latch socket 28 and at least one hook hole 29 that provide a means for attaching the lap rest 20 to the table clamp 30. The table clamp 30 has a latch 40 and at least one hook 50 that engage the latch socket 28 and at least one hook hole 29 respectively. The hooks 50 act as alignment pins for mating the lap rest 20 to the table clamp 30. The hook holes 29 act as receptors for the alignment functionality of the hooks 50.

For example, the lap rest 20 preferably has a latch socket 28 that is substantially centered from left to right on the undersurface 22. Alternatively, the latch socket 28 may be provided on the front surface 23 or back surface 24 of the lap rest 20. Preferably, the latch socket 28 has a mating flange 28a that extends from the edge of the latch socket 28 and is substantially parallel to the undersurface 22 of the lap rest 20. The latch socket 28 has a corresponding mating structure on the table clamp 30 that provides the means for attaching the lap rest 20 to the table clamp 30. In the embodiment shown in FIGS. 1 and 2, a latch 40 engages the mating flange 28a of the latch socket 28 to attach the lap rest 20 to the table clamp 30. The means for attaching the lap rest 20 to the table clamp 30, however, may be configured differently than depicted in FIGS. 1 and 2. For example, the latch socket 28 may be provided on the table clamp 30, and the corresponding latch 40 may provided on the undersurface 22 of the lap rest 20.

Additionally, as shown in FIG. 1, the front surface 23 of the lap rest 20 may have two hook holes 29 that are also substantially centered from left to right. The hook holes 29 may be alternatively provided on the undersurface 22 or back surface 24 of the lap rest 20. The hook holes 29 have corresponding mating structures on the table clamp 30 that provide the means for attaching the lap rest 20 to the table clamp 30. In the embodiment shown in FIGS. 1 and 2, the hooks 50 mate with hook holes 29. The means for attaching the lap rest 20 to the table clamp 30, however, may be configured differently than depicted in FIGS. 1 and 2. For example, the hook holes 29 maybe provided on the table clamp 30 and the corresponding hooks 50 may be provided on the lap rest 20.

Figure 3:
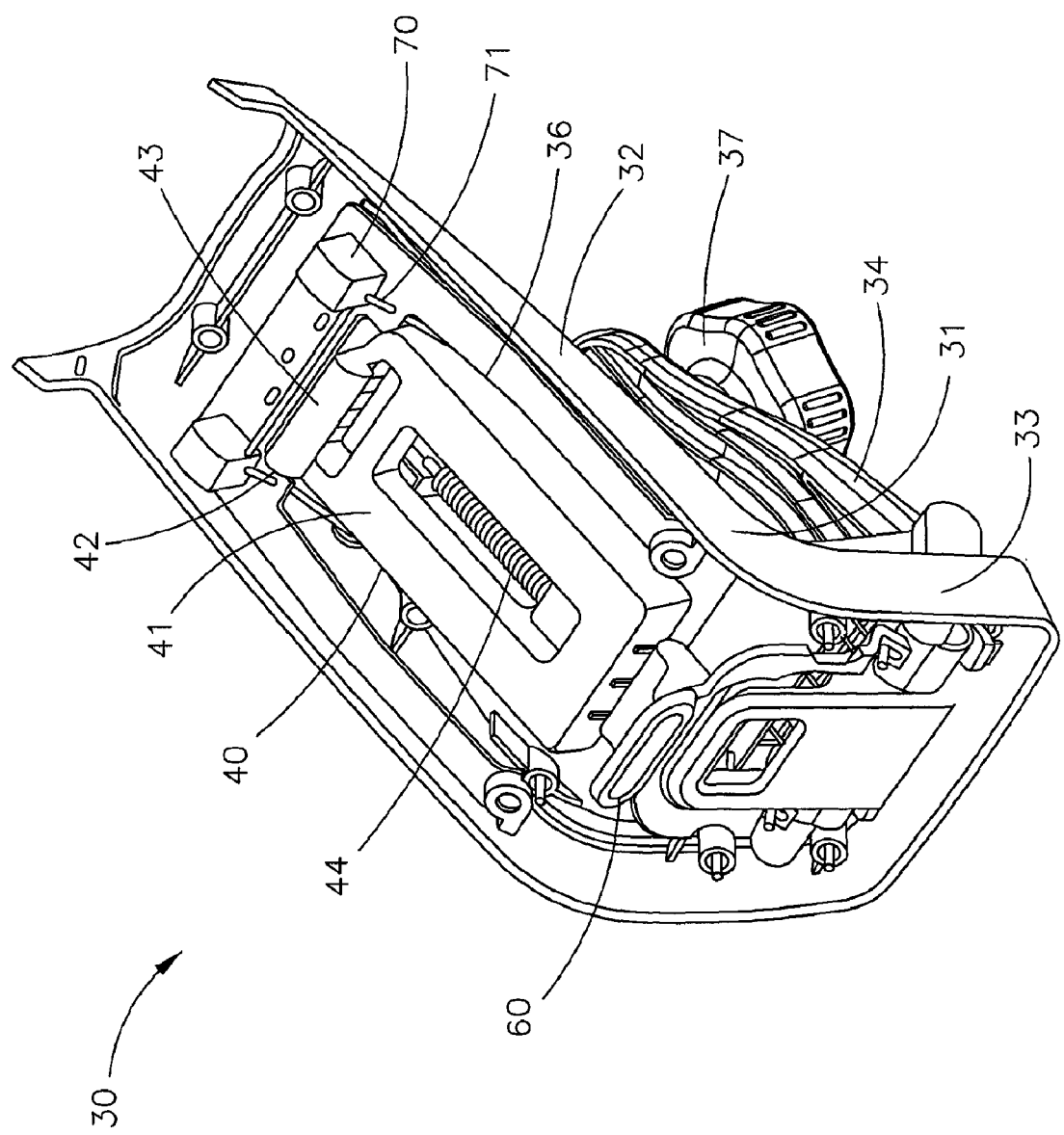
FIG. 3 shows a top view of the exemplary clamp of FIG. 1 with the cover removed.

According to one embodiment, as shown in FIG. 1, the table clamp 30 of the game controller 10 comprises a body 31 and a cover 35. FIG. 3 shows the table clamp 30 with the cover 35 removed. The body of the clamp 30 may have any suitable shape, but is preferably generally shaped like a C-clamp. In the embodiment of FIGS. 1 and 3, the table clamp 30 has a substantially C-shaped body 31 with a top section 32, a vertical section 33, a bottom section 34, and a clamping screw 37. As shown, the top section 32 and vertical section 33 are integrally formed, the bottom section 34 is pivotably connected to the vertical section 33, and the clamping screw 37 is connected to the bottom section 34. The bottom section 34, however, need not be pivotably connected and may be integrally formed with the top section 32 and vertical section 33. The clamp screw 37 is preferably adjustably connected to the bottom section 34 by screwing the clamp screw 37 through a threaded hole 38 in the bottom section 34.

As shown, the body 31 of the table clamp 30 is configured like a C-clamp such that a table top may be clamped between the top section 32 and the bottom section 34 of the body 31 of the clamp 30. The top section 32 of the body 31 of the table clamp 30 preferably extends horizontally and is configured to be secured on top of a table-top surface. In the embodiment shown in FIGS. 1 and 3, the table clamp 30 is configured to be secured to a table top with a clamp screw 37 that can be adjusted to accommodate table tops of varying thickness. The table clamp 30, however, may be adapted to be secured to a table top by any other conventional means, such as a suction cup (not shown). Also, the bottom section 34, as shown in FIGS. 1 and 3, may be pivotably connected to the vertical section 33 so that the bottom section 34 can be locked in an up position to engage the clamp, or it can be released into a down position to disengage the table clamp 30.

Additionally, the table clamp 30 includes means for attaching and detaching the lap rest 20 to the table clamp 30. FIGS. 1 and 3 show one embodiment of a table clamp 30 having means for attaching the lap rest 20 to the table clamp 30. As shown, the table clamp 30 preferably has a latch 40, at least one hook 50, a release button 60, at least one tip-up button 70, and at least one indexing finger 80.

According to one embodiment, the latch 40 preferably has an elongated striker portion 41 and a keeper portion 42 disposed on the distal end of the striker portion 41. The striker portion 41 of the latch 40 is substantially rectangular and is mounted in a slot 36 in the body 31 of the table clamp 30 such that the latch 40 can slide back and forth. The keeper portion 42 of the latch 40 is substantially perpendicular to striker portion 41 and has a cam surface 43. The latch 40 is spring loaded with a spring 44 that is connected to the latch 40 and body 31 of the table clamp 40. Also, a release button 60 is disposed on the body 31 of the table clamp 30 such that it is connected or in contact with the latch 40. The release button 60 and latch 40 are configured such that the latch 40 slides against the force of the spring 44 when the release button 60 is pressed. Also, tip-up buttons 70 are disposed on top of the top section 32 of the table clamp 30. The tip-up buttons 70 are preferably connected to the body of the table clamp 30 with a spring 71 such that the tip-up buttons are raised up, but can also be depressed. As shown, the latch 40, release button 60, and tip-up buttons 70 are connected to the body 31 of the table clamp 30 and protrude through holes in the cover 35 of the table clamp 30.

As shown, the hooks 50 and indexing fingers 80 are disposed on the cover 35 of the table clamp 30. Referring to FIG. 1, the hooks 50 are disposed on a vertical section of the cover 35 and are oriented horizontally, pointing toward the back of the table clamp 30. The indexing fingers 80 are disposed on a horizontal section of the cover 35 adjacent to the latch 40 and oriented vertically, pointing up. The indexing fingers 80 act to align the latch 40 to the latch socket 28 while the lap rest 20 is mounted onto table clamp 30. The hooks 50 and indexing fingers 80, however, may be oriented differently and/or disposed on different sections of the table clamp 30.

Referring to FIG. 1, the latch 40 and hooks 50 mate with the latch socket 28 and the hook holes 29 of the lap rest 20, respectively, to attach the lap rest 20 to the table clamp 30. When the lap rest 20 is attached to the table clamp 30, the undersurface 22 of the lap rest 20 contacts the top of the horizontal section 32 of the table clamp 30. In this embodiment, the lap rest 20 is placed over the table clamp such that the hooks 50 mate with the hook holes 29 in the front surface 23 of the lap rest 20. Additionally, the indexing fingers 80 are inserted in to the latch socket 28 to help locate the lap rest 20 on the table clamp 30 and to provide a more stable connection between the lap rest 20 and table clamp 30. Once the lap rest 20 is located over the table clamp 30 and pushed down, the keeper portion 42 of the latch 40 engages the mating flange 28a of the latch socket 28 in the undersurface 22 of the lap rest 20. The cam surface 43 on the keeper portion 42 of the latch 40 contacts the mating flange 28a of the latch socket 28 and allows the keeper portion 42 of the latch 40 to slide into engagement with the mating flange 28a of the latch socket 28 when the lap rest 20 is pushed down over the table clamp 30. Also, the spring 44 connected to the latch 40 and body of the table clamp 30 forces the latch 40 in a direction that engages the keeper portion 42 of the latch 40 with the mating flange 28a of the latch socket 28 of the lap rest 20.

Again, referring to FIG. 1, the table clamp 30 also has means for detaching the lap rest 20 from the table clamp 30. The release button 60 is connected or in contact with the latch 40 such that the latch 40 slides out of engagement with the latch socket 28 when the release button 60 is pressed. Also, the spring-loaded tip-up buttons 70 push the lap rest 20 up off the table clamp 30 when the latch 40 disengages, thereby helping detach the lap rest 20 and table clamp 30.

The means for attaching the lap rest 20 to the table clamp 30 may be configured differently than shown in FIG. 1. For example, the latch 40 may be configured to engage a latch socket 28 provided on the front surface 23 or back surface 24 of the lap rest 20. Also, the hooks 50 may be disposed on top of the top section 32 of the table clamp 30 and configured to engage hook holes 29 provided on the undersurface 22 or back surface 24 of the lap rest 20. Alternatively, the latch 40 and/or the hooks 50 may be provided on the lap rest 20 and the latch socket 28 and/or hook holes 29 may be provided on the table clamp 30.

Figure 4:
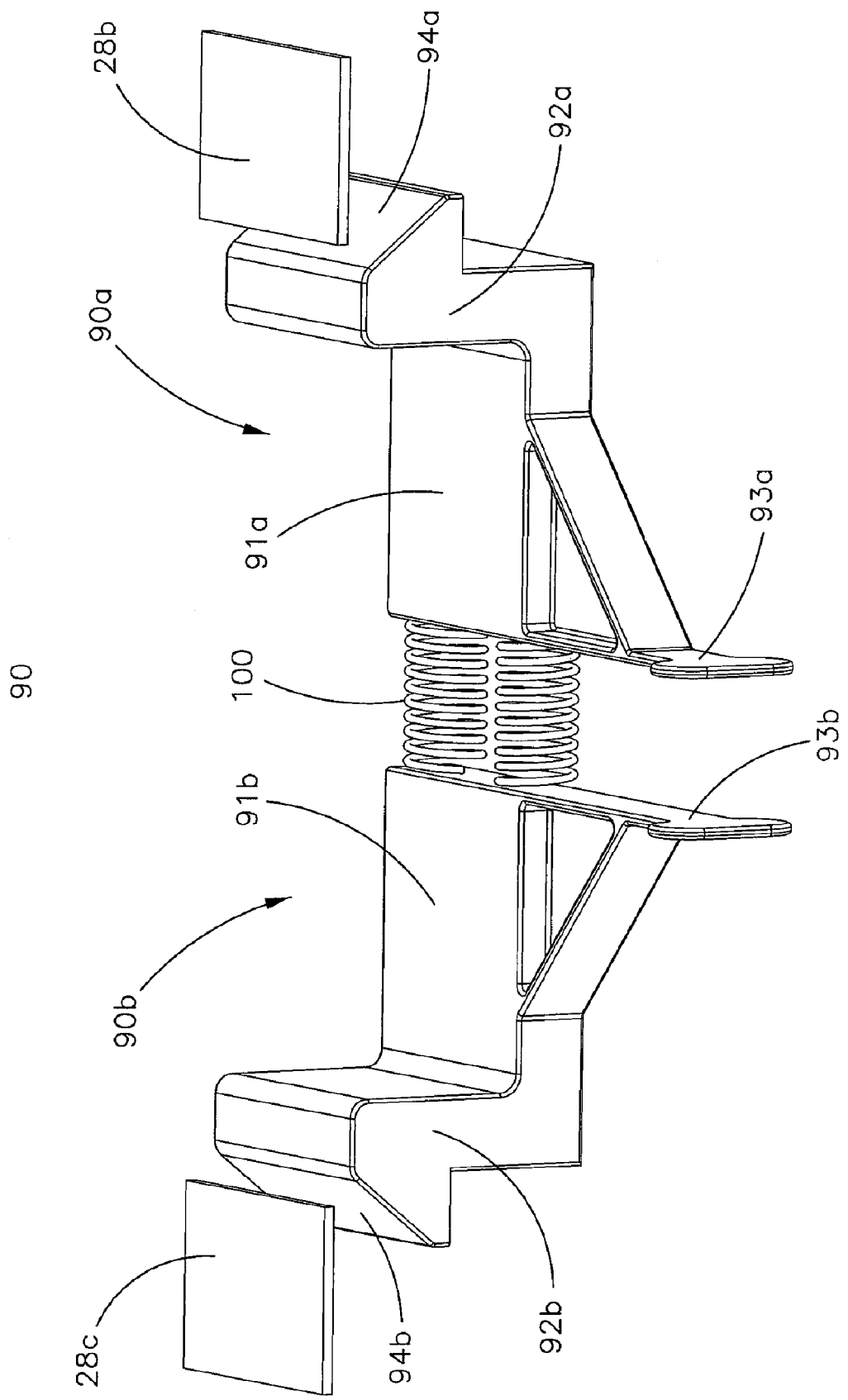
FIG. 4 shows an exemplary dual latch.

Also, in another embodiment, the table clamp 30 may be modified to use a dual latch 90 (shown in FIG. 4) in lieu of the latch 40 (shown in FIGS. 1 and 3) to attach the lap rest 20 to the table clamp 30. As shown in FIG. 4, the dual latch comprises a right section 90a and a left section 90b. The right 90a and left 90b sections each have an elongate striker portion 91a, 91b; a keeper portion 92a, 92b disposed on the outer end of the striker portion 91a, 91b; and a handle portion 93a, 93b disposed on the inner end of the striker portion 91a, 91b. The keeper portions 92a, 92b are substantially perpendicular to the striker portions 91a, 91b and have cam surfaces 94a, 94b. The handle portions 93a, 93b are substantially perpendicular to both the striker portions 91a, 91b and keeper portions 92a, 92b. The dual latch 90 may be mounted in a slot 36 in the body 31 of the table clamp 30 such that the right 90a and left 90b sections of the dual latch 90 can slide laterally in and out. Additionally, the right 90a and left 90b sections of the dual latch 90 are preferably connected with one or more springs 100 such that the right 90a and left 90b sections are pushed out laterally.

In this embodiment, once the lap rest 20 is located over the table clamp 30 and pushed down, the dual latch 90 engages the right 28b and left 28c mating flanges of the latch socket 28 in the undersurface 22 of the lap rest 20. The cam surfaces 94a, 94b on the keeper portion 92a, 92b contact the right 28b and left 28c mating flanges of the latch socket 28 and allow the keeper portions 92a, 92b of the dual latch 90 to slide into engagement with the right 28b and left 28c mating flanges of the latch socket 28. The springs 100 connecting the right 90a and left 90b sections of the latch 90 allow the right 90a and left 90b sections to slide in and out of engagement with the right 28b and left 28c mating flanges of the latch socket 28 of the lap rest 20. The handle portions 93a, 93b may be pressed together to move the right 90a and left 90b sections in, thereby disengaging the dual latch 90 from the latch socket 28.

The means for attaching and detaching the lap rest 20 and table clamp 30 allows a user to transition from use of the game controller on a lap top to a table top, or vice versa. For example, the table clamp 30 may be secured to a table top and a user may take the game controller 10 from his lap and attach the lap rest 20 to the table clamp 30 to use the game controller 10 on a table top. Alternatively, the lap rest 20 of the game controller 10 may be attached to the table clamp 30, and then, the game controller 10 may be secured to a table top. Also, the lap rest 20 of the game controller 10 may be detached from a table clamp 30 that is secured to a table top, or the table clamp 30 with the attached game controller 10 may be released from a table top together.

While aspects of the present invention has been described in connection with the preferred embodiments of the various figures, it is to be understood that other similar embodiments may be used or modifications and additions may be made to the described embodiments for performing the same function of the present invention without deviating therefrom. Therefore, the claimed invention should not be limited to any single embodiment, but rather should be construed in breadth and scope in accordance with the appended claims.

What is claimed:

1. A convertible game controller, comprising:
   a lap rest comprising at least an undersurface, a front surface, and a back surface;
   a latch socket provided on the undersurface of the lap rest, the latch socket comprising a mating flange;
   at least one hook hole provided on the front surface of the lap rest;
   a table clamp configured to secure the lap rest to a table, the table clamp comprising at least a top, a front, and a back;
   a latch disposed on the top of the table clamp; and
   at least one hook disposed in the front of the table clamp;
   wherein the at least one hook in the front of the table clamp fits into the at least one hook hole in the front surface of the lap rest such that the undersurface of the lap rest contacts the top of the table clamp; and
   wherein the latch on the top of the table clamp engages the mating flange of the latch socket such that the lap rest is removably secured to the table clamp.

2. The convertible game controller of claim 1, wherein the undersurface of the lap rest in downwardly curved.

3. The convertible game controller of claim 1, further comprising ribs disposed on the undersurface of the lap rest.

4. The convertible game controller of claim 1, wherein the undersurface of the lap rest further comprises lateral edges having support pads.

5. The convertible game controller of claim 1, wherein the latch is spring loaded such that there is a constant force in a direction that engages the latch with the mating flange of the latch socket.

6. The convertible game controller of claim 1, further comprising a release button being in contact with the latch, wherein the release button can be pressed such that the latch moves in a direction that disengages the mating flange of the latch socket and such that the lap rest can be separated from the table clamp.

7. The convertible game controller of claim 1, further comprising at least one tip-up button disposed on the top of the table clamp such that the at least one tip-up button contacts the undersurface of the lap rest, wherein the at least one tip-up button is spring loaded such that the at least one tip-up button pushes the lap rest up when the latch is disengaged from the latch socket.

8. A convertible game controller, comprising:
   a lap rest comprising at least an undersurface, a front surface, and a back surface;
   a latch socket provided on the undersurface of the lap rest, the latch socket comprising a mating flange;
   at least one hook hole provided on the back surface of the lap rest;
   a table clamp configured to secure the lap rest to a table, the table clamp comprising at least a top, a front, and a back;
   a latch disposed on the top of the table clamp; and
   at least one hook disposed in the back of the table clamp;
   wherein the at least one hook in the back of the table clamp fits into the at least one hook hole in the back surface of the lap rest such that the undersurface of the lap rest contacts the top of the table clamp; and
   wherein the latch on the top of the table clamp engages the mating flange of the latch socket in the undersurface of the lap rest such that the lap rest is secured to the table clamp.

9. The convertible game controller of claim 8, wherein the undersurface of the lap rest in downwardly curved.

10. The convertible game controller of claim 8, further comprising ribs disposed on the undersurface of the lap rest.

11. The convertible game controller of claim 8, wherein the undersurface of the lap rest further comprises lateral edges having support pads.

12. The convertible game controller of claim 8, wherein the latch is spring loaded such that there is a constant force in a direction that engages the latch with the mating flange of the latch socket.

13. The convertible game controller of claim 8, further comprising a release button being in contact with the latch, such that when the release button is pressed the latch moves in a direction that disengages the mating flange of the latch socket.

14. The convertible game controller of claim 8, further comprising at least one tip-up button disposed on the top of the table clamp such that the at least tip-up button contacts the undersurface of the lap rest, wherein the at least one tip-up button is spring loaded such that the at least one tip-up button pushes the lap rest up when the latch is disengaged from the latch socket.

15. A convertible game controller, comprising:
   a lap rest;
   a table clamp configured to secure the lap rest to a table;
   a latch disposed on the lap rest;
   at least one hook disposed on the table clamp;
   a latch socket provided in the table clamp, the latch socket comprising a mating flange;
   at least one hook hole provided in the lap rest;
   wherein the at least one hook on the table clamp fits into the at least one hook hole in the lap rest; and
   wherein the latch engages the mating flange of the latch socket such that the lap rest is secured to the table clamp.

16. The convertible game controller of claim 15, wherein the undersurface of the lap rest in downwardly curved.

17. The convertible game controller of claim 15, further comprising ribs disposed on the undersurface of the lap rest.

18. The convertible game controller of claim 15, wherein the latch is spring loaded such that there is a constant force in a direction that engages the latch with the mating flange of the latch socket.

19. The convertible game controller of claim 15, further comprising a release button being in contact with the latch, such that when the release button is pressed the latch moves in a direction that disengages the mating flange of the latch socket.

20. The convertible game controller of claim 15, further comprising at least one tip-up button disposed on the top of the table clamp such that the at least one tip-up button contacts the undersurface of the lap rest, wherein the at least one tip-up button is spring loaded such that the at least one tip-up button pushes the lap rest up when the latch is disengaged from the latch socket.

* * * * *